United States Patent [19]

Ruben

[11] Patent Number: 4,755,494

[45] Date of Patent: Jul. 5, 1988

[54] USE OF PECTIN OR PECTIN-LIKE MATERIAL IN WATER-BASED CERAMICS

[75] Inventor: George C. Ruben, Lebanon, N.H.

[73] Assignee: Trustees of Dartmouth College, Hanover, N.H.

[21] Appl. No.: 13,914

[22] Filed: Feb. 12, 1987

Related U.S. Application Data

[63] Continuation-in-part of Ser. No. 919,321, Oct. 14, 1986, abandoned.

[51] Int. Cl.$^4$ .............................................. C04B 33/04
[52] U.S. Cl. ...................................... 501/148; 501/82
[58] Field of Search ................. 501/141, 145, 148, 81, 501/82

[56] References Cited

U.S. PATENT DOCUMENTS

| | | | |
|---|---|---|---|
| 722,791 | 3/1903 | Acheson | 501/141 |
| 2,776,897 | 1/1957 | Hazelwood | 501/141 |
| 4,022,633 | 5/1977 | Schneider | 106/208 |
| 4,206,245 | 6/1980 | Drevici | 106/205 |
| 4,219,362 | 8/1980 | Colegrove | 106/93 |
| 4,333,863 | 6/1982 | Lindroth | 106/209 |
| 4,452,905 | 6/1984 | Drinkuth | 501/81 |
| 4,520,139 | 5/1985 | Kennedy | 106/162 |

OTHER PUBLICATIONS

*Clays*, Heinrich Ries, p. 174 (1927), John Wiley & Sons, London.

*Encyclopedia of Chemical Technology*, Kirk Othmer, 3rd Ed., vol. 12, pp. 45–46, 61.

*The Condensed Chemical Dictionary*, 10th Ed., Van Nostrand Reinhold Co., pp. 488, 780, 992–993, 1075.

*Dictionary of Ceramic Science & Engineering*, Loran O'Bannon, pp. 127, 173.

Primary Examiner—William R. Dixon, Jr.
Assistant Examiner—Andrew B. Griffis
Attorney, Agent, or Firm—Hamilton, Brook, Smith & Reynolds

[57] ABSTRACT

The use of pectins (or pectin-like materials) as an additive to clay to provide clay compositions of enhanced plasticity and stability is disclosed.

6 Claims, No Drawings

USE OF PECTIN OR PECTIN-LIKE MATERIAL IN WATER-BASED CERAMICS

RELATED APPLICATIONS

This application is a connuation-in-part of U.S. application Ser. No. 919,321 now abandoned filed Oct. 14, 1986.

BACKGROUND OF THE INVENTION

With conventional clays, it is technically difficult to construct large structures and structures with substantial unsupported projections. Typically, the cohesion of clay compositions in the working phase and their ability to resist deformation is not sufficient to support such structures. Drying (i.e. air, bisque or high temperature firing) stress generally produces clay cracking and consequent loss of structural integrity. Where such structures are desired, internal scaffolding may be required but is generally insufficient for preventing these deformation or drying problems.

SUMMARY OF INVENTION

This invention pertains to the use of pectin or pectin-like material (e.g. carboxymethylcellulose, alginic acid) as an additive to heterogeneous clay compositions to produce cohesive wet clay mixtures for the production of stoneware, earthenware, porcelain, new clay formulations and water polymerized glasses (i.e. sol gels). The clay mixtures of this invention handle as if homogeneous; they can be worked over a longer period of time; and they are plastic in their shaping properties but maintain their form after shaping and dry more uniformly (i.e. just as fast at the center as at the edges). The compositions comprise mixtures of clay and pectin or pectin-like material (together referred to as "pectic material"), the amount of pectic material being sufficient to enhance the controlled plasticity and dimensional stability of the clay when worked. The clay compositions are prepared by mixing the pectin material and clay. The pectin is generally added to the clay before the water is added, or alternatively, it is mixed into the prescribed amount of water before the addition of the clay. The mixture of clay, pectin and water is blended thoroughly to provide clay which can be worked in normal fashion and thereafter fired. The pectin enhances the controlled plasticity and dimensional stability of the clay during working phases which allows for productions of large or projecting wheel thrown or slab-constructed ceramic structures.

DETAILED DESCRIPTION OF THE INVENTION

The clay compositions of this invention are prepared by mixing a pectic material in desired proportion with a clay (e.g. potter's clay). Generally, the pectic material is added to the clay before water is added; the pectic material and clay are mixed thoroughly, and subsequently, water is added and mixed thoroughly into pectic-containing clay composition. When particulates are added e.g. grog and mullite, a thorough mixing can be achieved by adding grog, mullite, and pectic material to the prescribed amount of water, mixing for about five minutes, and then mixing in the clay. The composition so formed can then be worked by conventional methods and subsequently fired. The firing achieves temperatures sufficient to incinerate the pectic material, which is only required for the working, dimensional stability (or deformation resistance) and drying phases, from the final ceramic.

Pectins are polysaccharide constituents of plant cell walls. Pectin consists largely of long chains of galacturonic acid units. Many forms of pectin and pectin-like materials are commercially available. The latter are long chain sugars in which carboxylic acid groups attached to some of the sugar residues and which form as 0.05–5% soluble solutions that gel in the presence of di- or trivalent positive ions.

Suitable pectin-like materials are linear chain of sugars which have some chains branching and which contain long sequences ( 25 residues) with esterified or de-esterified carboxylic acid groups of at least four per 10 sugar residues. These materials are characterized by their solubility in water, easy de-esterification in basic solutions, and their ability for form gels as 0.1–2% solutions with di-or trivalent positive ions. Two such pectin-like materials useful for forming the clay compositions of this invention are carboxymethylcellulose and alginic acid.

For preparation of the clay compositions of this invention, the pectic material is mixed with clay in proportions sufficient to confer enhanced plasticity and stability upon the clay for desired applications. Generally, the amount of pectic material is about 0.05–5.0 weight percent, preferably about 0.1–2 weight percent (pectic material to clay material). Pectins of various chain lengths can be used, generally ranging from 25–4400 sugar units (5,000–1,000,000 molecular weight). The pectins can be used in an esterified or nonesterified form, although the de-esterified form is preferred. The amount of pectin and the kind of pectin which is optimal for a particular application can be determined in accordance with the working properties required.

Clays with pectin contents of approximately 2–5 weight percent pectin are less plastic and difficult to shape and/or to work their surface. A secondary surface application of 1–5 molar volatile acid (e.g. acetic acid, hydrochloric acid, formic) makes the clay more plastic during the working phases and more deformation resistance on partial drying.

The addition of pectic material provides a number of advantages. The pectin enhances the controlled plasticity while maintaining deformation resistance after shaping, increases cohesion of heterogeneous clay mixtures which attain working properties similar to homogeneous clays, and extends working time and uniform drying properties. The pectic material stabilizes the clay body during working phases. During air drying, moisture evaporation occurs evenly thus reducing cracking of the clay. Further, the pectin additives extend the period of workability and leaves unaffected the normal contraction characteristics of fired clay so that glaze formulations remain the same.

This combination of features makes possible the production of larger clay forms, the addition of more substantial projections to the forms and improved control over all stages of the production process.

This invention is further illustrated by the following examples:

EXAMPLE 1

Potter's clay is mixed thoroughly with pectin (USP L/200 Genu Pectin TM) at 0.1 weight percent of pectin to clay. After mixing, water is added, and the initial mixtures and the water are thoroughly mixed. The resulting mixture is worked in normal fashion and then fired.

EXAMPLE 2

In a clay mixture requiring particulates such as grog and mullite, the water is added to the mixer and 0.1-2 weight percent (USP L/200 Genu Pectin ™) pectin and the particulates are mixed for about five minutes before the clay is slowly added to the solution and thoroughly mixed. The resulting mixture is worked in normal fashion and then fired.

EXAMPLE 3

Porcelain clay mixtures, containing up to 15% white clays (grollege, EPK clay from Georgia) were mixed with 0.1-2 weight percent pectin (USP L/200 Genu Pectin ™). The compositions could be worked easily on a potter's wheel and they dried evenly without normal surface cracking over flat regions. About 28% overall final shrinkage was observed.

Equivalents

Those skilled in the art will recognize, or be able to ascertain using no more than routine experimentation, many equivalents to the specific embodiments of the invention described herein. Such equivalents are intended to be encompassed by the following claims.

I claim:

1. A clay composition consisting essentially of a mixture of clay and pectin having from about 25 to about 4400 sugar units, the amount of pectic material ranging from about 0.05 to about 5% by weight in relation to the clay.

2. A clay composition of claim 1, wherein the amount of pectin is about 0.1 to about 2.0 weight percent.

3. A clay composition consisting essentially of a mixture of clay, mullite, grog and a pectin having from about 25 to about 4400 sugar units, the amount of pectic material ranging from 0.05 to about 5% by weight in relation to the clay.

4. A clay composition of claim 3, wherein the amount of pectin is about 0.1 to about 1.0 weight percent.

5. A clay composition comprising a mixture of clay and a said pectin consisting essentially of a polysaccharide chain having from 25 to about 4400 sugar units and at least four esterified or nonesterified carboxylic acid groups per ten sugar units, the amount of pectin ranging from 0.5 to about 5% by weight in relation to the clay.

6. A clay composition of claim 5, wherein the pectin is 0.1 to aboout 1.0 weight percent.

* * * * *